(12) United States Patent
Llopis

(10) Patent No.: US 12,527,433 B2
(45) Date of Patent: Jan. 20, 2026

(54) DEVICE AND METHOD FOR GRINDING PLANT MATERIAL IN GRAINS

(71) Applicant: Sanremo Coffee Machines S.R.L., Carbonera (IT)

(72) Inventor: Danilo Llopis, Carbonera (IT)

(73) Assignee: Sanremo Coffee Machines S.R.L., Carbonera (IT)

( * ) Notice: Subject to any disclaimer, the term of this patent is extended or adjusted under 35 U.S.C. 154(b) by 222 days.

(21) Appl. No.: 17/769,568

(22) PCT Filed: Sep. 28, 2020

(86) PCT No.: PCT/IT2020/050232
§ 371 (c)(1),
(2) Date: Apr. 15, 2022

(87) PCT Pub. No.: WO2021/074935
PCT Pub. Date: Apr. 22, 2021

(65) Prior Publication Data
US 2024/0115077 A1 Apr. 11, 2024

(30) Foreign Application Priority Data
Oct. 16, 2019 (IT) .................. 102019000019103

(51) Int. Cl.
*A47J 42/44* (2006.01)
*A47J 42/50* (2006.01)

(52) U.S. Cl.
CPC .............. *A47J 42/44* (2013.01); *A47J 42/50* (2013.01)

(58) Field of Classification Search
CPC .. A47J 42/40; A47J 42/44; A47J 42/50; A47J 42/54
See application file for complete search history.

(56) References Cited

U.S. PATENT DOCUMENTS

| 3,021,984 A | * | 2/1962 | Engi | ........................ | A47J 42/40 |
| | | | | | 222/196 |
| 5,386,944 A | * | 2/1995 | Knepler | ................. | G01G 19/52 |
| | | | | | 241/34 |

(Continued)

FOREIGN PATENT DOCUMENTS

| EP | 2314183 A1 | 4/2011 |
| EP | 3430951 A1 | 1/2019 |

(Continued)

OTHER PUBLICATIONS

English translate (HU0000573A2), retrieved date Apr. 13, 2024.*

(Continued)

*Primary Examiner* — Mohammed S. Alawadi
(74) *Attorney, Agent, or Firm* — PCFB, LLC; Justin K. Flanagan

(57) ABSTRACT

A device (10) is described, for grinding plant material in grains comprising: a containing hopper (11), configured to contain the plant material in grains to be ground and comprising a dragging mechanism to withdraw the plant material in grains from the hopper (11) and pour it into a containing tank (14); a load cell (13), to weigh a preset amount of plant material in grains in the containing tank (14); a collecting tank (16), comprising dragging means (26) to receive the plant material in grains or to allow the direct insertion into the device (10) of plant material in grains; a grinding chamber (17), comprising grinding means configured to receive the plant material in grains supplied by the dragging means (26) and grind it.

13 Claims, 3 Drawing Sheets

(56) References Cited

U.S. PATENT DOCUMENTS

| | | | |
|---|---|---|---|
| 5,632,449 A | 5/1997 | Sandolo | |
| 5,690,283 A * | 11/1997 | Sandolo | A47F 1/02 |
| | | | 241/34 |
| 6,725,889 B2 * | 4/2004 | Perez Vales | G07F 13/025 |
| | | | 141/286 |
| 2010/0011975 A1 * | 1/2010 | Mazzer | A47J 31/401 |
| | | | 165/104.34 |
| 2017/0367537 A1 * | 12/2017 | Illy | A47J 42/50 |
| 2018/0296037 A1 | 10/2018 | Tseng | |

FOREIGN PATENT DOCUMENTS

| | | | |
|---|---|---|---|
| HU | 0000573 A2 * | 7/2000 | |
| WO | 2015055343 A1 | 4/2015 | |
| WO | 2015056241 A1 | 4/2015 | |
| WO | 2015124592 A1 | 8/2015 | |
| WO | 2021074936 A1 | 4/2021 | |

OTHER PUBLICATIONS

Sanremo Coffee Machines S.R.L., International Patent Application PCT/IT2020/050232, International Search Report and Written Opinion Mailed Jan. 22, 2021, 9 pp.

Sanremo Coffee Machines S.R.L., International Patent Application PCT/IT2020/050233, International Search Report and Written Opinion Mailed Nov. 19, 2020, 8 pp.

* cited by examiner

US 12,527,433 B2

DEVICE AND METHOD FOR GRINDING PLANT MATERIAL IN GRAINS

CROSS-REFERENCE TO RELATED APPLICATIONS

This application is a national phase entry under 35 U.S.C. § 371 of International Patent Application PCT/IT/2020/050232, filed Sep. 28, 2020, designating the United States of America and published in English as International Patent Publication WO 2021/074935 on Apr. 22, 2021 for "DEVICE AND METHOD FOR GRINDING PLANT MATERIAL IN GRAINS," which claims priority to Italian Patent Application No. 102019000019103 filed on Oct. 16, 2019, the disclosures of both of which are hereby incorporated herein in their entireties by this reference.

TECHNICAL FIELD

The present invention refers, in general, to a device and a method for grinding plant material in grains; in particular, the present invention refers to a device and a method for grinding coffee in grains, but can be used for grinding other plant products in grains, such as for example pepper or the like.

In an embodiment, the present invention refers to a device for grinding different qualities of coffee in grains configured to refill a filter-holder, in particular the filter it contains, with a blend of ground coffee obtained from different types of coffee.

BACKGROUND

Devices are known in the art for grinding plant material in grains which are adapted to supply the filter-holder, held next to the spout of the grinding device, with a dose of powder of ground material.

Prior art devices for grinding plant material in grains have the problem of not allowing to get to fill with a uniform and homogeneous mixture of the filter-holder, and of the filter contained therein, in particular with ground coffee powder, obtained from the mixing of different types of coffee; they also have the problem that, grinding material of different qualities, for example different varieties of coffee, and mixing it in the same filter-holder, require the operator's intervention with a significant waste of time and complication in the grinding process.

SUMMARY

Object of the present invention is solving the above prior art problems, by providing a device and a method for grinding plant material in grains, which allow optimally filling the filter, contained in the filter-holder, with the powder of material in ground grains obtained from different types of plant material, in particular different varieties of coffee.

The above and other objects and advantages of the invention, as will result from the following description, are obtained with a device for grinding plant material in grains as claimed in the independent claim. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as included in the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION

Figure 1:
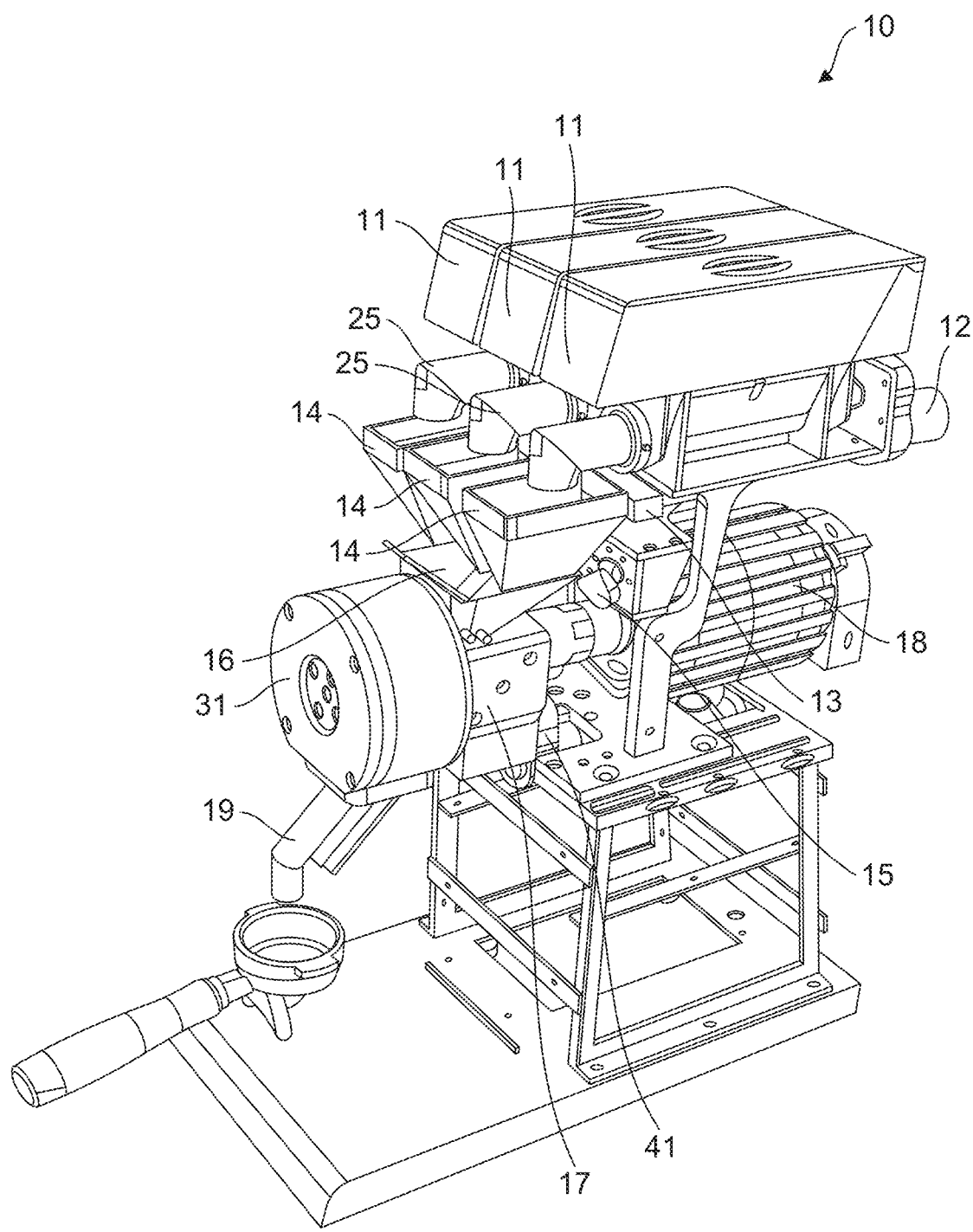
FIG. 1 is a perspective view of a device for grinding plant material in grains according to the present invention.
Figure 2:
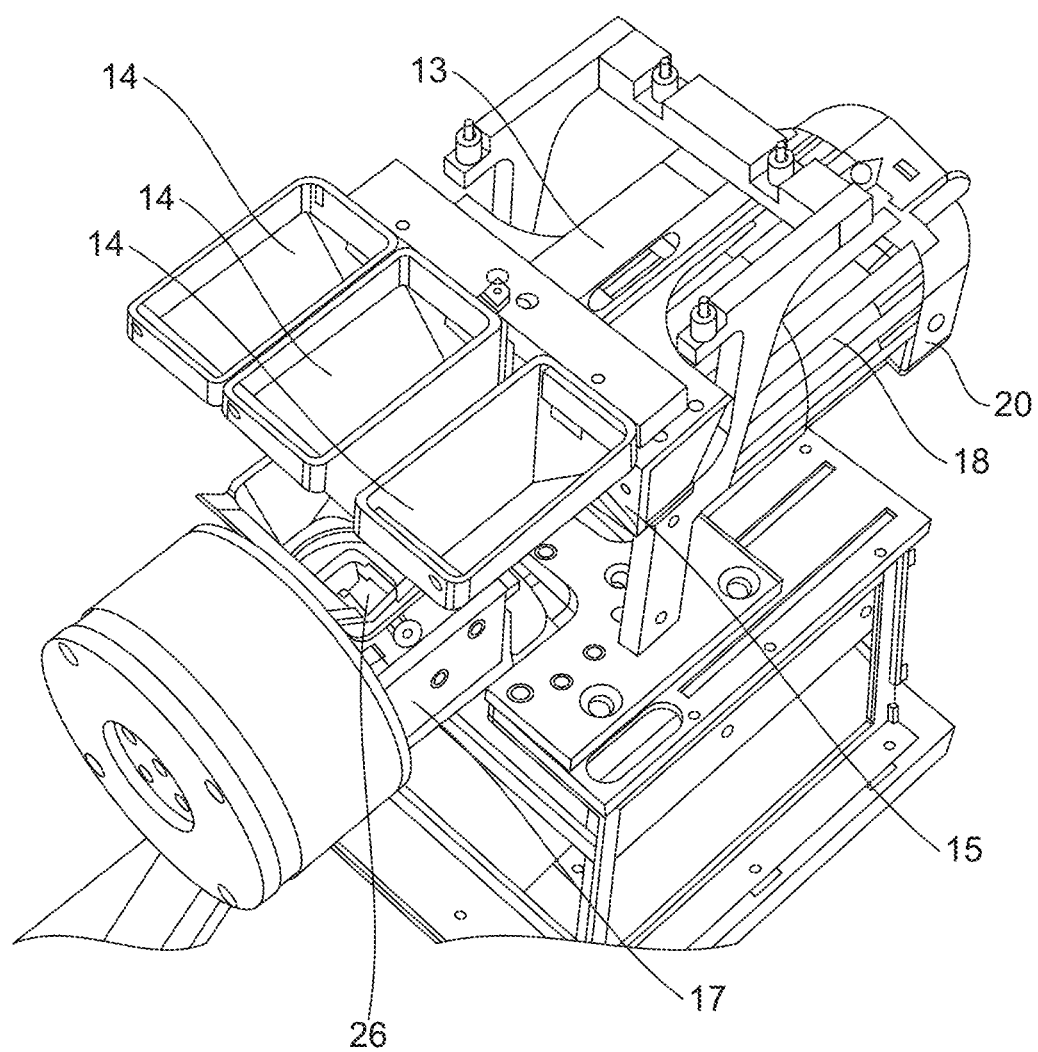
FIG. 2 is a top perspective view of a device for grinding plant material in grains according to the present invention.
Figure 3:
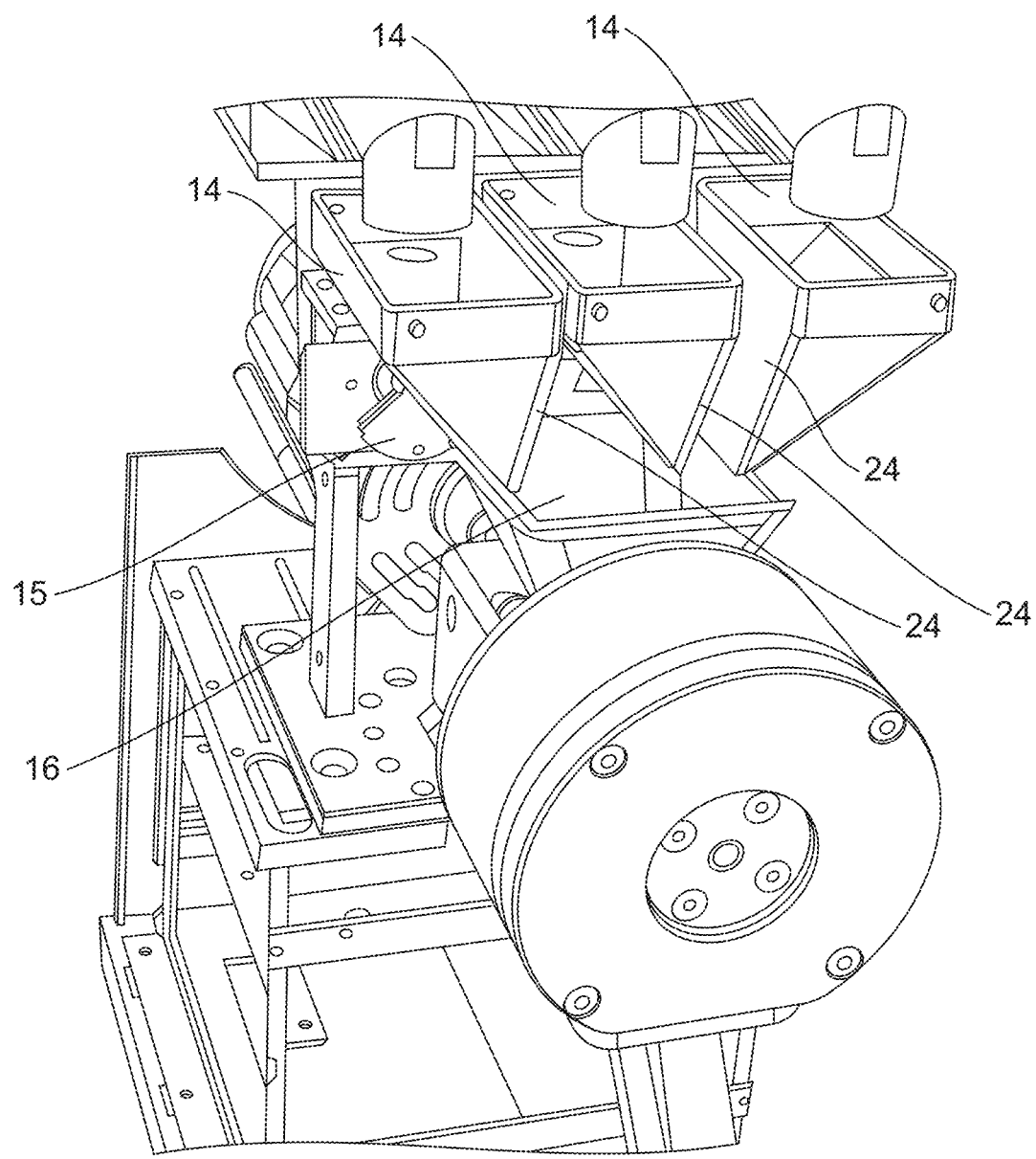
FIG. 3 is a front perspective view of a device for grinding plant material in grains according to the present invention.

With reference to the Figures, a preferred embodiment of the device for grinding plant material in grains according to the present invention is shown and described.

The device 10 for grinding plant material in grains of the invention, shown in the figures, comprises:

at least one containing hopper 11, preferably a plurality of containing hoppers 11 (for example three hoppers 11), configured to contain the plant material in grains to be ground and comprising a dragging mechanism connected to at least one dosing motor 12 and configured to withdraw the plant material in grains from the at least one hopper 11 and pour it into at least one containing tank 14, preferably a containing tank 14 for each hopper 11, through at least one duct 25, preferably a duct 25 for each hopper 11;

at least one load cell 13, configured to weigh a preset amount of plant material in grains, poured by the dragging mechanism into the at least one containing tank 14; in an embodiment, the device 10 of the invention comprises a load cell 13 for each containing tank 14;

the at least one containing tank 14, comprising a connecting opening to a collecting tank 16, the opening being closed by a closing element 24, for example a door 24, the at least one containing tank 14 being configured to contain the amount of plant material in grains delivered by the at least one dosing motor 12;

an opening system 15 of the at least one containing tank 14, for example a motor 15, configured to move the closing element 24, opening the connecting opening of the at least one containing tank 14 and allowing the passage of the plant material in grains from the at least one containing tank 14 to the collecting tank 16;

the collecting tank 16, comprising dragging means 26, for example an auger 26, the collecting tank 16 being configured to receive the plant material in grains coming from the at least one hopper 11 or to allow the direct insertion into the device 10 of the invention of plant material in grains, preferably coffee in grains, through a suitable opening obtained in the collecting tank 16;

the dragging means 26, for example the auger 26, connected to at least one grinding motor 18 and configured to drive the plant material in grains exiting from the at least one containing tank 14 to a grinding chamber 17;

the grinding chamber 17, comprising grinding means, for example grinders of a known type, the grinding means being connected to the at least one grinding motor 18 and being configured to receive the plant material in grains supplied by the dragging means 26 and grind it; the grinding chamber 17 further comprises a delivering element 19, for example a spout 19, configured for delivering the ground plant material and equipped with systems for reducing the retention of the powder of ground material by the delivering element 19, in particular surface treatments, mechanical and electro-mechanical systems, for example a vibrating motor;

cooling means 20, for example a forced ventilation system 20 comprising at least one fan, connected to the grinding motor 18;

a handling system of the grinding means 41, configured for setting the granulometry of the plant material exiting from the grinding chamber 17, for example regulating the distance of the grinders, which can be electronically and/or manually regulated, preferably with a different regulation for each individual hopper being selected;

an electronic control unit configured to control the motors 12, 15, 18 and the handling system;

a command interface 31, configured for setting the grinding parameters.

The method for grinding plant material in grains of the invention will be described below, in an application referred to grinding of coffee, which comprises the following steps:

a step of setting, through suitable interface, a weight value of the coffee in grains weighed by the load cell 13 or a delivering time of the coffee in grains by the dosing motor 12, by the user;

a optional step of selecting, through suitable interface, the hopper 11 from which the coffee in grains must be withdrawn by the user;

a step of starting the device 10 for grinding coffee in grains, in which the dosing motor 12 is started by the user;

a step of dosing the coffee in grains; in this step, if a value of the coffee weight has been set, in the step of setting, the load cell 13 performs the measure of the preset amount of coffee in grains delivered by the dosing motor 12, while if a coffee delivering time has been set, in the step of setting, the dosing motor 12 delivers the coffee in grains for the preset time interval; the dosing motor 12 is managed by the electronic control unit and modulated in its speed in order to obtain the preset weight of coffee in grains or activated for the preset time and at a predetermined speed; in particular, if a value of coffee weight has been set, the speed of the dosing motor 12 is modulated depending on the difference between the weight read by the load cell 13 and the weight value being set;

a step of turning off the dosing motor 12, after having reached the preset value of weight or time;

a step of activating the grinding motor 18 which actuates both the grinding means in the grinding chamber 17 and the dragging means 26 in the collecting tank 16 and, after a preset time, of activating the opening system 15 of the at least one containing tank 14 in order to allow the passage of the coffee in grains from the at least one containing tank 14 to the collecting tank 16 comprising the dragging means 26;

an optional step of activating the systems for reducing the retention of the powder of ground material by the delivering element 19;

a step of grinding, by the grinding means, the coffee in grains driven in the grinding chamber 17 by the dragging means 26; the step goes on till exhausting the coffee to be ground and ends upon reaching a predetermined maximum grinding time value or upon reaching preset thresholds of vacuum and load absorbed power from the grinding motor 18 during the grinding step;

a step of turning off the grinding motor 18 and, after a preset time, of de-activating the systems for reducing the retention of the powder of ground material.

In a second embodiment, the grinding method of the invention further comprises the following step:

a step, which precedes the step of grinding, of directly inserting by the user an amount of coffee in the opening of the collecting tank 16, for example for grinding an additional amount of coffee or coffee with a different quality with respect to the one present in the at least one hopper 11; the opening of the collecting tank 16 is closed by a door which is opened by the user for inserting coffee into the collecting tank 16, the opening of the door being signaled by a suitable sensor.

In a third embodiment, the grinding method of the invention further comprises the following steps:

a step, following the step of setting a weight value of the coffee or a delivering time of the coffee or the optional step of selecting the hopper 11 from which the coffee to be ground must be withdrawn, of enabling the pre-dosing function by the user through a suitable interface 31;

a step wherein the device 10, after the step of turning off the dosing motor 12 for reaching the preset values of weight or time, remains in a waiting state;

a step wherein the user, through a suitable interface 31, activates the grinding motor 18;

reiterating the method from the dosing step to the step wherein the turning off of the dosing motor 12 occurs and the device 10 remains in a waiting state.

In a fourth embodiment, the grinding method of the invention further comprises the following steps:

a step, following the step of enabling the pre-dosing function, of selecting by the user through a suitable interface 31, at least two mixtures of coffee and of the related amount in terms of weight, percentage or time on the total volume to be delivered;

a step of enabling the mixing function through a suitable interface 31, followed by the step of dosing the coffee to be ground;

a step of dosing the coffee in grains wherein, in the devices with single load cell (13), the grains of a containing tank (14) are weighed one at a time, while in the devices comprising a plurality of load cells (13) the grains are weighed simultaneously on all load cells (13);

a step of activating the grinding motor 18 and, after a preset time, of activating the system 15 which opens every containing tank 14, according to programmed sequences and times.

Advantageously, the device and the method for grinding plant material in grains of the invention allows obtaining an optimum filling of the filter, contained in the filter-holder, with the powder of ground material in grains obtained from different types of plant material, in particular different varieties of coffee.

The invention claimed is:

1. A device for grinding plant grains comprising:
at least two containing hoppers to contain the plant grains to be ground, the at least two containing hoppers including at least a first containing hopper and a second containing hopper;

at least two containing tanks, the at least two containing tanks including at least a first containing tank to receive the plant grains from the first containing hopper and a second containing tank to receive the plant grains from the second containing hopper;

at least two dosing motors, the at least two dosing motors including at least a first dosing motor controllable to deliver the plant grains from the first containing hopper into the first containing tank and a second dosing motor controllable to deliver the plant grains from the second containing hopper into the second containing tank;

at least two load cells, wherein each load cell is connected to one of the containing tanks to measure an amount of plant grains therein, the at least two load cells including at least a first load cell connected to the first containing tank to measure an amount of the plant grains actually in the first containing tank and a second load cell connected to the second containing tank to measure an amount of the plant grains actually in the second containing tank;

a collecting tank to receive and contain the measured amount of the plant grains from the at least two containing tanks, including at least the first containing tank and the second containing tank;

a dragging means to drive the plant grains from the collecting tank into a grinding chamber; and a grinder within the grinding chamber to grind the plant grains.

2. The device of claim 1, further comprising:
a delivering element to deliver the ground plant grains from the grinding chamber; and a powder retention reduction system to reduce retention of powder of the ground plant grains by the delivering element.

3. The device of claim 1, wherein the collecting tank comprises an opening for direct, manual insertion of the plant grains by a user.

4. The device of claim 1, wherein the dragging means comprises an auger.

5. The device of claim 1, further comprising:
a first closing element that, in a closed position, closes an opening in the first containing tank;
a second closing element that, in a closed position, closes an opening in the second containing tank; and
an opening system controllable to move the first and second closing elements to an open position to allow passage of the plant grains from each of the first and second containing tanks into the collecting tank.

6. The device of claim 5, further comprising a grinding motor to drive the grinder.

7. The device of claim 6, comprising:
a cooling means connected to the grinding motor; and
wherein the grinder comprises a handling system to set a granularity parameter of the grinder.

8. The device of claim 6, wherein the grinding motor is further configured to drive the dragging means.

9. The device of claim 8, further comprising:
an electronic control unit in communication with the at least two load cells, the grinding motor, the at least two dosing motors, and the opening system; and
a command interface to receive grinding parameters set by a user.

10. The device of claim 2, wherein the powder retention reduction system comprises at least one of: a surface treatment and a vibrating motor.

11. A device for grinding plant grains comprising:
at least two containing hoppers to contain the plant grains to be ground, the at least two containing hoppers including at least a first containing hopper and a second containing hopper;

at least two containing tanks to receive the plant grains from the at least two containing hoppers, the at least two containing tanks including at least a first containing tank to receive plant grains from the first containing hopper and a second containing tank to receive plant grains from the second containing hopper;

at least two dosing motors, the at least two dosing motors including at least a first dosing motor controllable to deliver the plant grains from the first containing hopper into the first containing tank and a second dosing motor controllable to deliver the plant grains from the second containing hopper into the second containing tank;

at least two load cells, wherein each load cell is connected to one of the containing tanks to measure an amount of plant grains therein, the at least two load cells including at least a first load cell connected to the first containing tank to measure an amount of the plant grains inside the first containing tank and a second load cell connected to the second containing tank to measure an amount of the plant grains inside the second containing tank;

a collecting tank to receive and contain the measured amount of the plant grains from the at least two containing tanks, and wherein the collecting tank has an opening for direct, manual insertion of the plant grains by a user;

a dragging means to drive the plant grains from the collecting tank into a grinding chamber;

a grinder within the grinding chamber to grind the plant grains;

a grinding motor to drive the grinder and the dragging means;

an electronic control unit in communication with the at least two load cells, the grinding motor, and the at least two dosing motors;

a command interface to receive grinding parameters set by the user;

a delivering element to deliver the ground plant grains from the grinding chamber; and a powder retention reduction system to reduce retention of powder of the ground plant grains by the delivering element.

12. The device of claim 11, wherein the powder retention reduction system comprises at least one of: a surface treatment and a vibrating motor.

13. A device for grinding plant grains comprising:
a first containing hopper to contain a first type of plant grains to be ground;
a second containing hopper to contain a second type of plant grains to be ground;
a first containing tank to receive the first type of plant grains from the first containing hopper;
a second containing tank to receive the second type of plant grains from the second containing hopper;
a first dosing motor controllable to deliver the first type of plant grains from the first containing hopper into the first containing tank;
a first load cell connected to the first containing tank to measure an amount of the first type of plant grains within the first containing tank;
a second dosing motor controllable to deliver the second type of plant grains from the second containing hopper into the second containing tank;

a second load cell connected to the second containing tank to measure an amount of the second type of plant grains within the second containing tank;

a collecting tank to receive and contain the measured amount of the first and second types of plant grains from the first containing tank and the second containing tank, respectively;

a dragging means to drive the first and second types of plant grains from the collecting tank into a grinding chamber; and a grinder within the grinding chamber to grind the first and second types of plant grains.

* * * * *